United States Patent [19]

Satoh et al.

[11] Patent Number: 4,821,254
[45] Date of Patent: Apr. 11, 1989

[54] INFORMATION RECORDING AND REPRODUCING APPARATUS WHICH DETECTS DETERIORATION OF A MEDIUM IN EACH SECTOR BEFORE RECORDING

[75] Inventors: Isao Satoh, Neyagawa; Yoshihisa Fukushima, Osaka; Makoto Ichinose, Sakai; Yuzuru Kuroki, Toyonaka; Yuji Takagi, Neyagawa, all of Japan

[73] Assignee: Matsushita Electric Industrial Co., Ltd., Kadoma, Japan

[21] Appl. No.: 866,954

[22] Filed: May 27, 1986

[30] Foreign Application Priority Data

May 27, 1985 [JP] Japan .................. 60-113621

[51] Int. Cl.⁴ .................. G11B 7/00; G11B 7/013
[52] U.S. Cl. .................. 369/54; 369/32; 369/58; 364/200
[58] Field of Search .................. 369/32, 54, 58, 53, 369/33, 41, 59; 360/25, 31, 53, 78; 364/200, 900; 371/10, 13

[56] References Cited

U.S. PATENT DOCUMENTS 4,434,487 2/1984 Rubinson et al. .................. 371/10
4,498,146 2/1985 Martinez .................. 364/900

FOREIGN PATENT DOCUMENTS

60-226085 11/1985 Japan .

Primary Examiner—Alan Faber
Assistant Examiner—Steven R. Garland
Attorney, Agent, or Firm—Cushman, Darby & Cushman

[57] ABSTRACT

An information recording and reproducing apparatus detects deterioration in a recording medium. Structure is provided for recording information including an error correction code. A signal indicative of recorded information is received, and an error signal indicative of a number of errors that are detected is produced. This error signal is based on verification of the error correction code. The error correction code is verified using a strict clipping level, which is a level stricter than a usual level recognized as a particular signal level. This strict clipping level is compared with the signal indicative of reading areas, and error signals are produced thereby. When the error signal indicates a number of errors greater than a predetermined number, each sector is checked to determine if it is a bad sector. Each bad sector is recorded with a mark signal that indicates a bad sector. Before writing on the disk, each target sector is read verified using the strict clipping level, and mark signals indicative of a bad sector are recorded on any bad sectors. According to another aspect, the read verify operation is also carried out for a directory sector to ensure that the directory sector is correct.

8 Claims, 10 Drawing Sheets

INFORMATION RECORDING AND REPRODUCING APPARATUS WHICH DETECTS DETERIORATION OF A MEDIUM IN EACH SECTOR BEFORE RECORDING

BACKGROUND OF THE INVENTION

1. Field of the Invention

This invention relates to a information recording and reproducing apparatus of a type for preventing errors caused by deterioration of the recording medium.

2. Description of the Related Art

Figure 8:
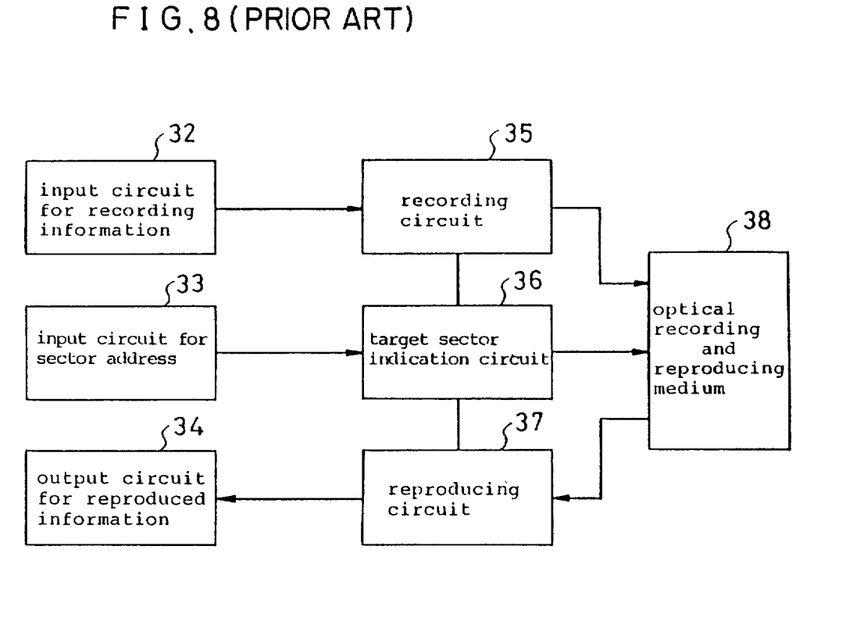
FIG. 8 is a block diagram of a prior information recording and reproducing apparatus.

Japanese publication examined patent No. Sho 60-226085 discloses an information recording and reproducing apparatus that is shown in FIG. 8. During recording operation, information to be recorded is recorded on target sectors of an optical recording and reproducing medium 38 by a recording circuit 35. During reproducing, the recorded information on the target sectors is reproduced by a reproducing circuit 37.

This apparatus has a disadvantage that a reproducing error caused by a deterioration of recording medium in any sector that has been repeatedly recorded cannot be detected. Thus, a reproducing error cannot be prevented in this situation. In an apparatus such as this having an exchangeable recording medium, the deterioration of respective recording media differ from each other. Therefore prevention of this kind of reproducing error is difficult.

OBJECT AND SUMMARY OF THE INVENTION

It is an object of the present invention to provide an information recording and reproducing apparatus which can prevent any error caused by deterioration of the recording medium.

The information recording and reproducing apparatus in accordance with the present invention comprises:

An information recording and reproducing apparatus using a reversible optical disk having a recording area of a sector structure and a directory sector which indicates an area in said recording area, comprising:

recording means for recording information including an error correction code;

error detecting means receiving a signal indicative of recorded information on sectors of said optical disk for generating an error signal indicative of a number of errors detected by verifying said error correction code in said reading signal said error detector means comprising:

(a) means for producing a strict clipping level, which is a level stricter than a usual level which is recognized as a particular signal level;

(b) comparator means for comparing said signal indicative of reading areas with said strict clipping level and producing an error signal based on said comparison and (c) means for counting said error signals, checking means responsive to said error signal from said error detecting means for checking each sector to determine if it is a bad sector, when said error signal indicates a number of errors over a predetermined number;

second recording means, connected to said checking means, for recording a mark signal on any bad sector detected by said checking means; and processing means for:

(a) read-verifying a target sector using said clipping level producing means and said comparator means of said error detecting means before updating data;

(b) receiving a result of said error detecting means from said checking means; and (c) recording said mark signal using said second recording means on any sector determined to be bad sector.

DESCRIPTION OF THE PREFERRED EMBODIMENTS

Figure 1:
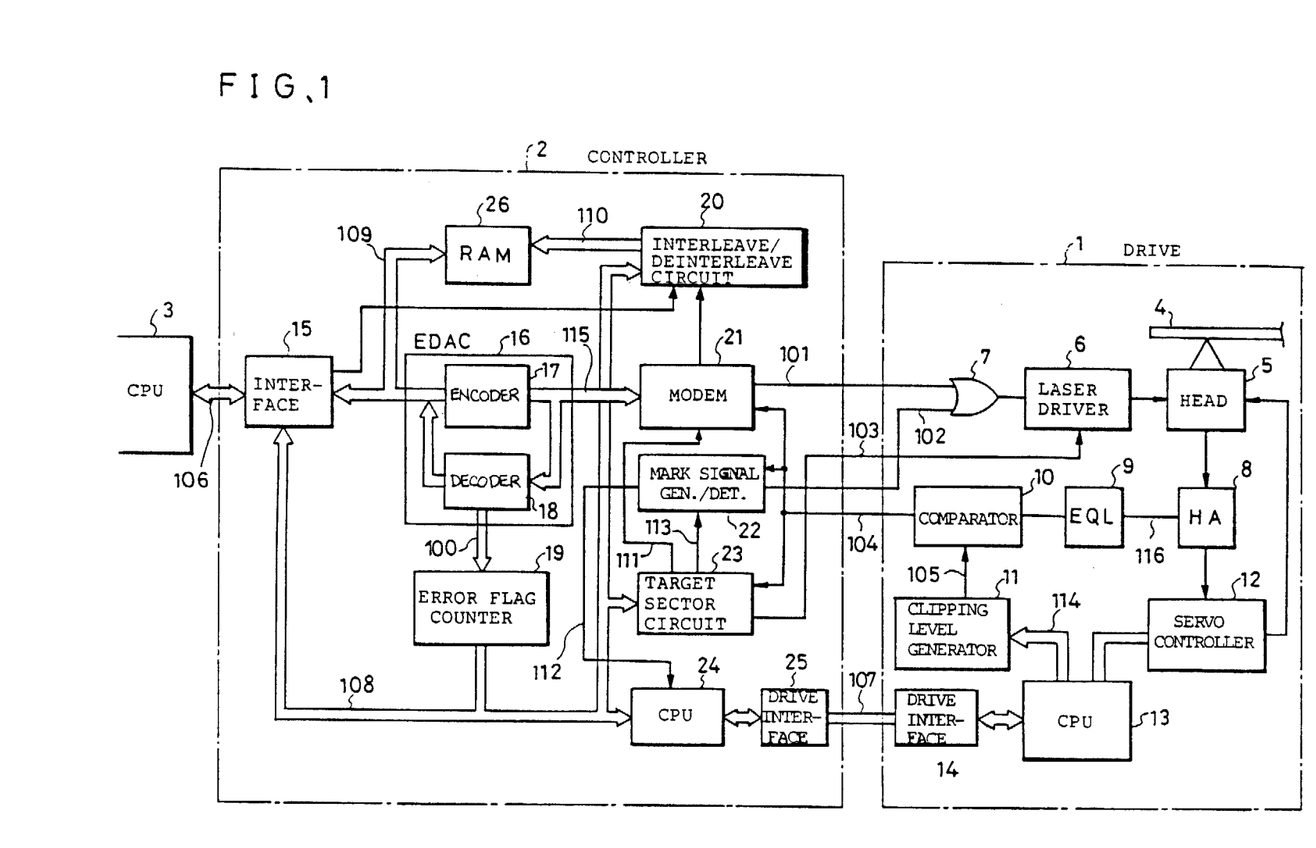
FIG. 1 is a block diagram of an information recording and reproducing apparatus in accordance with the present invention.

FIG. 1 is a block diagram of an information recording and reproducing apparatus in accordance with the present invention. FIG. 1 includes a drive 1 for recording and reproducing information on or from a reversible optical disk, a controller 2, and a CPU 3 for commanding the controller 2 and the drive 1 to record or reproduce information.

The drive 1 includes an optical head 5 for recording on and reproducing from a reversible disk 4, and a laser driver 6 driven by OR gate 7. A head amplifier 8 (HA) reproduces and amplifies the signals from the head 5. An equalizer 9 corrects any distortion of the reproducing signal. A binary code signal is then formed from the analog signal by comparator 10. A clipping level generator 11 changes the clipping level (threshold level) of the comparator 10. A servo controller 12 is also provided, Numeral 13 designates a CPU for controlling the drive 1, and numeral 14 designates a drive interface. A disk motor and linear motor for driving the disk 4 are not shown.

The controller 2 includes system interface 15, Error Detection And Correction circuit (EDAC) 16, encoder 17 for producing error correction signals, decoder 18 for error correction signals, error flag counter 19, an interleave/deinterleave circuit 20 for randomizing burst errors, a digital modulation/demodulation circuit 21 (MFM (Modified frequency modulation), (2);(7) RLL (Run length limited code), or the like), a generator/detector 22 for producing a marking signal, a target sector circuit 23 for detecting the target sector commanded by a CPU 24, a drive interface 25, and a RAM 26.

Numeral 101 designates a data line for writing from controller 2 to drive 1. Numeral 102 designates a line for the marking signal. Numeral 103 designates a line for the erasing gate signal. Numeral 104 designates a data line for reading. Numeral 105 designates a line for the clipping level signal. Numeral 106 designates a system bus. Numeral 107 designates a interface line for drive control. Numeral 108 designates a bus for the CPU 24. Numeral 109 designates a bus for internal data. Numeral 110 designates address lines for the RAM 26. Numeral 111 designates a line for a sector indicating signal. Numeral 112 designates a line for the detecting signal of marking signal. Numeral 113 designates a line for the trigger signal for the marking signal. Numeral 114 designates a line for command signal of the clipping level. Numeral 115 designate a bus for internal data. Numeral 116 designates a line for the reproducing signal.

Figure 2:
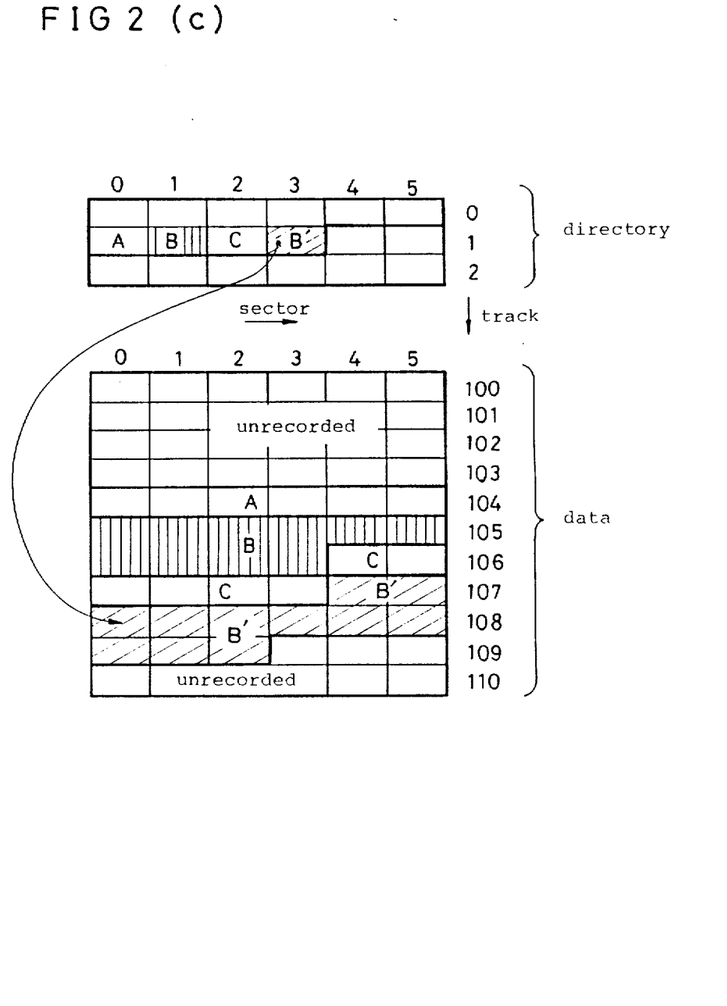
FIGS. 2(a), 2(b) and 2(c) show sectors on the recording medium.
Figure 2A:
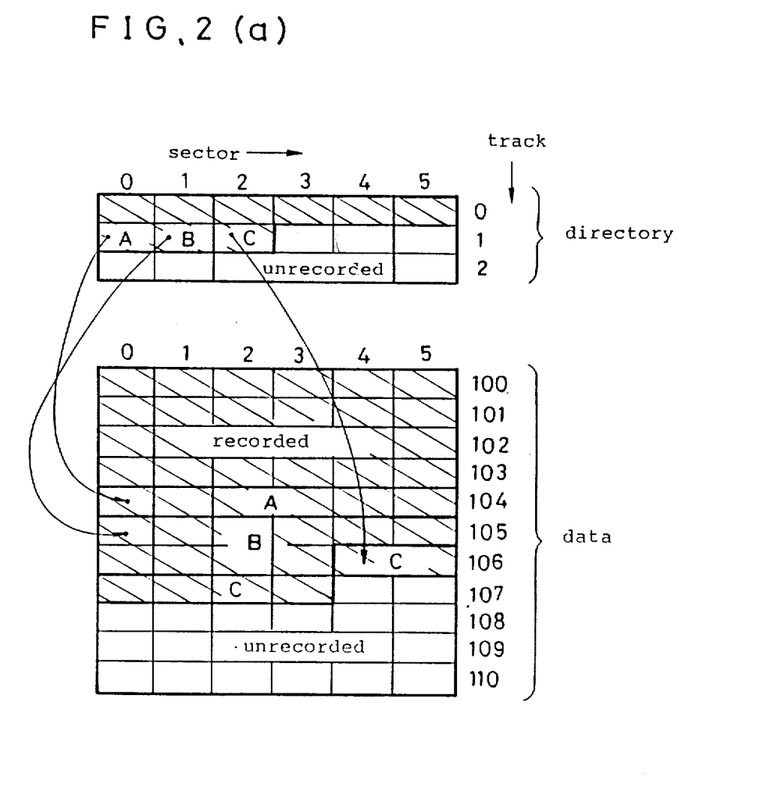
Figure 2B:
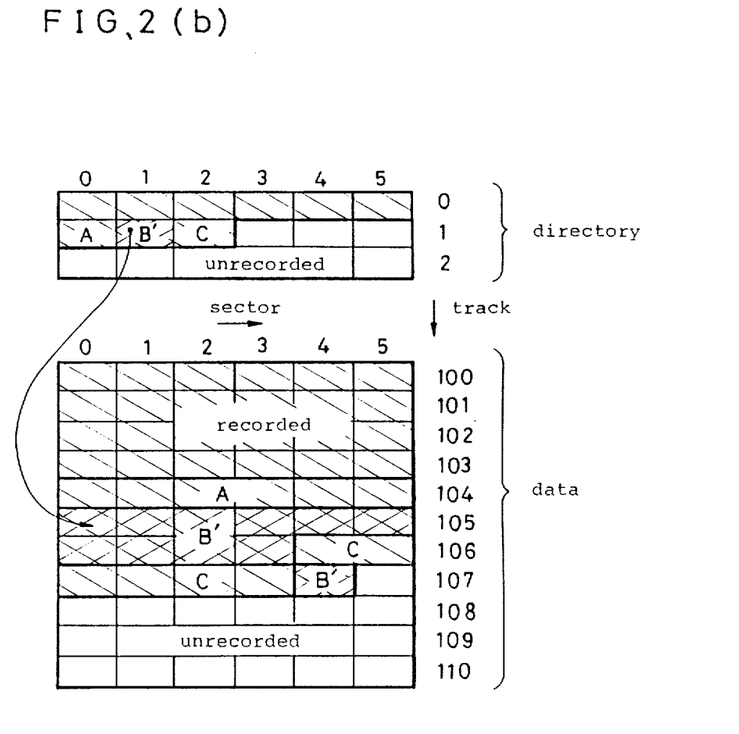

FIG. 2(a) shows a sector on the reversible optical disk. FIG. 2(a) shows the sectors as being distinguished between directory sectors (g tracks 0 to 2) and data sectors (eg tracks 100 to 110). Each track has 6 sectors (numbered 0 to 5).

Sectors 0 to 5 of the track 104 are recorded as a file A having a directory in track 1, sector 0. Sectors 0 of track 105 to sector 3 of the track 106 are recorded as a file B, and sector 4 of the track 106 to sector 3 of the track 107 are recorded as a file C. The directories for the files A, B and C are recorded on sectors 0 to 2 respectively of the track 1.

The updating operation will be described referring to FIGS. 2(a), 2(b), 2(c) and 3.

Figure 3:
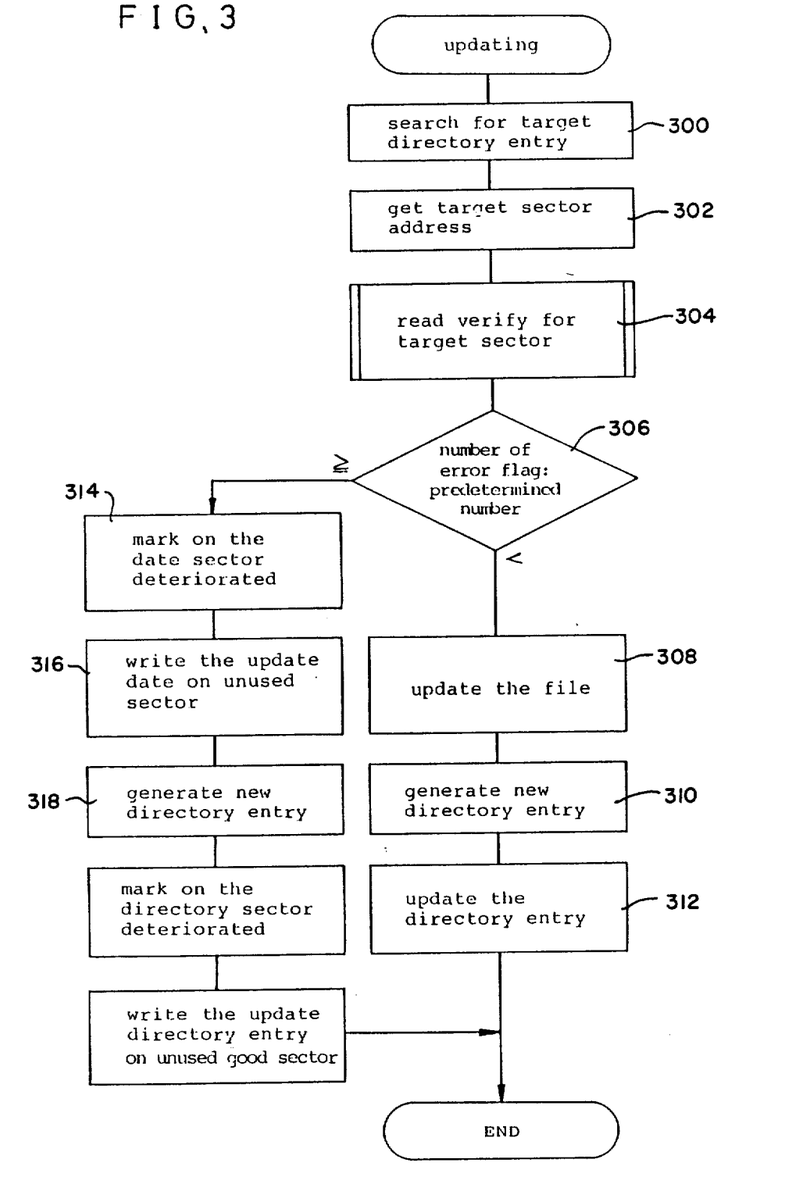
FIG. 3 is a flow chart of an update operation.

(1) The CPU 3 searches the target director for an entry of the file B, by reading the directories from the reversible disk 4 in step 300 of FIG. 3, and finds the target directory on the sector 1 of track 1 at step 302.

(2) The CPU 3 then issues a command to verify the sector of the target directory entry by outputting a read verify command to the system bus 106 at step 304.

(3) The CPU 24 of the controller 2 starts a read verify operation after clearing the error flag counter 19.

(4) The read verify operation is as follows:

(a) The controller 2 outputs a search command for the target track to the drive 1. This includes CPU 24 outputting track address signals on the line 107 through the drive interface 25. The CPU 13 of the drive 1 receives the track address signals and controls the servo controller for moving the head 5 along the target track. After confirming that the head 5 is moving on the target track, the drive 1 outputs a completion signal for indicating a completion of the seek to the controller 2.

(b) The controller 2 outputs a command for determining the clipping level to the drive 1. CPU 13, which is in the drive 1, outputs a clipping level signal on line 114 (which is a digital signal) to the clipping level generator 11. Generator 11, in turn, converts the digital signal indicative of the clipping level to an analog signal indicative of clipping level. The comparator 10 receives the clipping level and the analog signals, and converts the reproduced analog signals to binary code signals based on the clipping level. In the update operation, the clipping level is higher during the update operation than it is in the normal read operation. Therefore a strict read verify operation (requiring higher levels of logic levels) is carried out during the update operation.

(c) The controller 2 sets the target track address and the target sector address to the target sector circuit 23. After receiving the target sector, the target sector circuit 23 outputs a finding signal on the line 111. Then, the MODEM 21 begins digital demodulation. The head 5 converts optical signals reproduce from the reversible optical disk 4 into electrical analog signals. The electrical analog signals are amplified by the head amplifier 8 and are equalized by the equalizer 9. The equalized analog signals are converted to digital signals by the comparator 10.

(d) The digital signals output on the line 104 are demodulated and the demodulated signals are output on the internal bus 115. The interleave/deinterleave circuit 20 is switched to interleave mode. The demodulate data are passed through the EDAC 16 (in this case the signals are merely passed through the EDAC 16), and are stored in the RAM 26. In the interleave mode, the data are stored in row according to the row sequence at first, as shown by an arrow A in FIG. 4. Next, the data are stored in row 2 in the same sequence, so on. Each row is filled with the data in the column sequence, as shown by an arrow B in FIG. 4.

Figure 4:
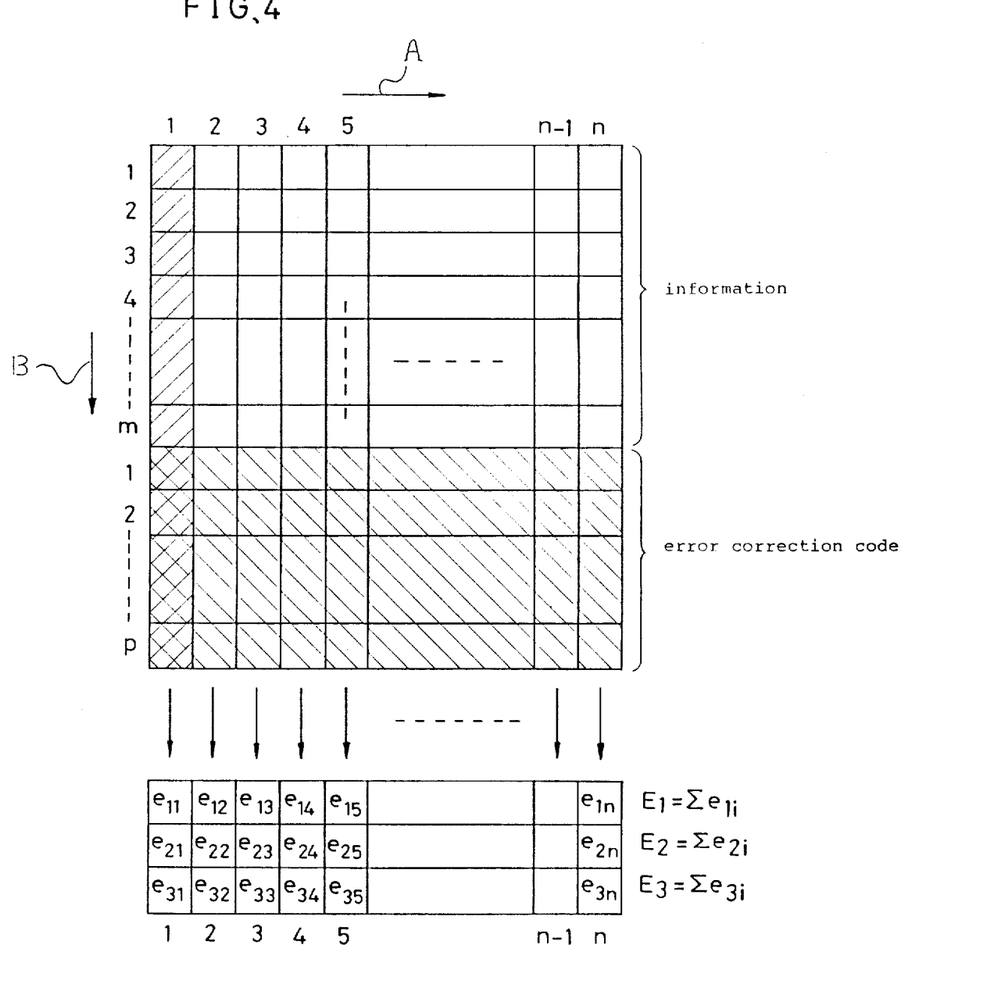
FIG. 4 show code words.

The CPU 24 detects an end of the demodulation and switches the interleave/deinterleave circuit 20 the deinterleave mode. Then the CPU 24 commands the decoder 18 to operate. In the deinterleave mode, the data are read from column 1 according to the column sequence at first, as shown by an arrow B. Next, the data are read from column 2, and so on. Each column is read in the row sequence, as shown by an arrow A.

The decoder 18 generates an error correction code, and also detects and corrects the errors. The corrected data are stored in the RAM 26.

(e) The decoder 18 detects the type of error (a single error, a double error, uncorrectable error or the like) and outputs the error signal to one of the lines 100 corresponding to the kind of error. The error flag counter 19 counts the number of errors.

(f) The CPU 24 detects an end of the sector reading operation by detecting an end of the decoding.

(g) The CPU 24 then checks whether the counted number of errors is less than a predetermined number or not at step 306.

(5) The controller 2 sends a signal indicative of a result of the check to the CPU 3.

(6) When a good result is produced, the deterioration of the recording medium is assumed to be light. The CPU 3 therefore commands the controller 2 and the drive 1 to update the file at step 308, to write new data on sector 0 of the track 105 to sector 3 of the track 106 (10 sectors) as shown in FIG. 2a. Then the CPU 3 commands to write the rest of the new data on sector 4 of the track 107 (FIG. 2(b). Next, the CPU 13 commands an update of the directory entry at steps 310 and 312 (on track 1, sector 1). The updated directory entry has information that the file B' is constructed with 2 areas, one is on sector 0 of the track 105 to sector 3 of track 106 and the other is on sector 4 of the track 107. By the above-mentioned operation, the file B is updated to the file B' (see FIG. 2(b)).

(7) When a bad result is produced at step 306, the deterioration of the recording medium is assumed to be large. The CPU 3 then commands the controller 2 and the drive 1 to write a deterioration marking, to show the particular deteriorated sectors among the deteriorated sectors at step 314 (in this case sector 0 of the track 105 to sector 3 of the track 106 and sector 1 of the track 1). The CPU 3 then determines a number of unused good sectors, and issues a command to write file B' on the good sectors at step 316, i.e. sector 4 of the track 107 to sector 2 of the track 109, instead of on the bad sectors. Next, the CPU 3 commands a writing of an updated directory entry at step 318 (on track 1 sector 3). This updated directory entry has information file B/ on sector 4 of the track 107 to sector 2 of the track 109. This operation, the file B is updated to the file B' as shown in FIG. 2(c).

Although the data and the directory in the above embodiment are updated after marking, in other embodiments the data and the directory may be updated before marking. In the latter case, the data can be recovered even if a breakdown takes place during the updating operation.

Next, the recording operation is described. The CPU 3 output a write command signal on the system bus 106. The write command signal has a write command code, a target track, a target sector and the number of sectors to be recorded. The controller 2 receives the command signal via the system interface 15. The controller 2 commands the drive 1 to search the target sector. The controller 2 also requests the CPU 3 to transfer the information to be recorded. The CPU 3 transfers the information to the RAM 26 through the interface 15, using a direct memory access (DMA).

After completing the transfer of the information for one sector, the CPU 24 commands the encoder 17 to operate and transfers the data stored in the RAM 26 to the encoder 17. The encoder 17 generates and outputs the error correction signals. The CPU 24 stores the data added with the error correction signals in the RAM 26. The data are stored in the deinterleaved mode.

After completing the encoding operation for one sector, the CPU 24 sets the target track address and the target sector address to the target sector circuit 23. Further, the CPU 24 switches the MODEM 21 to the modulation mode and turns the interleave/deinterleave circuit 20 in the interleave mode.

The target sector circuit 23 asserts the line 111 for the sector indicating signal. The data stored in the RAM 26 is output on the data line 101 for writing through the internal bus 109, EDAC 16 (in this case the signals are merely passed through the EDAC 16) the internal bus 115 and the MODEM 21. The data outputted on the line 101 drives the head 5.

Re-recording of the information on the sector is carried out by two steps, namely, erasing the target sectors and recording the information on the target sectors. The target sector circuit 23 outputs the sector detecting signal on the line 103 for the erasing gate signal. By receiving the signal, the laser driver 6 and the head 5 operate in the erasing mode. The reversible optical disk 4 is annealed for erasing the recorded information.

Next, the laser driver 6 and the head 5 operate in the recording mode. Rapidly-heated parts on the reversible optical disk 4 are changed to an amorphous state, corresponding to the data to be recorded.

Next, the reading operation is described. The reading operation is basically the same as the aforementioned read verify operation except that the clipping level of the comparator 10 is set to the normal level and that the decoded signals are transferred to the CPU 3 through the internal bus 109, the system interface 15 and the system bus 106.

FIG. 4 shows the information which is added with the error correction code (hereinafter referred to as a code-word). One code-word consists of m bits of information and p bits of error correction code. A number of the code-words are shown. Each code-word corresponds to the error flag counter 19. In this embodiment, the Red-Solomon Code is used as the error correction code. The error flag counter 19 counts the single error flags the number of single error flags is $E1=\Sigma e1i$), double error flag (number of double error flag is $E2=\Sigma e2i$) and triple error flag (number of triple error flag is $E3=\Sigma e3i$).

It seems that the deterioration of the optical recording medium is caused by fatigue, i.e. increase of the random error which deteriorates the S/N rate, increase of the burst error by destroying of the medium (which is caused by thermal stress on the wounded track). Therefore, for example, the detection standards of the deterioration by the numbers E1, E2 and E3 of the error flags are as follows:

(1) standard A:

To read-verify the recorded data under the condition of strict clipping level.

To judge the sector as a good sector when E2 and E3 are equal to zero.

To judge the sector as deteriorated sector when either of E2 or E3 is not equal to 0.

(2) standard B:

To read-verify the recorded data under the condition of normal clipping level.

To judge the sector as good sector when E1 is less than Ne (Ne is a constant number determined by deterioration mechanism of the medium) and E2 and E3 are equal to zero.

To judge the sector as deteriorated sector when E1 is not less than Ne, E2 not equal to zero or E3 is not equal to zero.

Figure 5A:
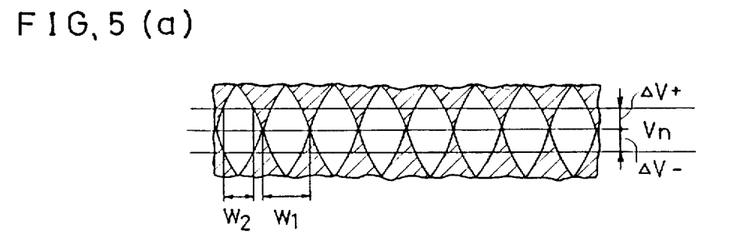
FIGS. 5(a) and 5(b) show eye patterns of the reproducing signal.
Figure 5B:
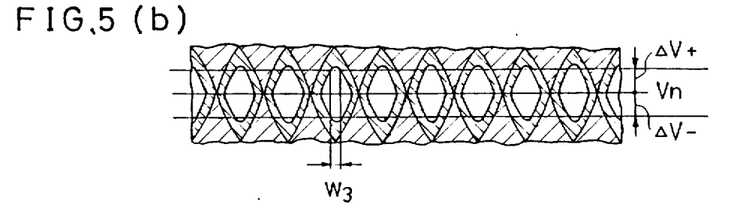

FIGS. 5(a) and 5(b) show the eye-patterns as outputs of the equalizer 9 for the reversible optical disk. FIG. 5(a) shows the eye-pattern for the good sector. FIG. 5(b) shows the eye-pattern for the deteriorated sector.

Vn in FIG. 5(a) shows the normal clipping level, and $Vn+\Delta V$ show the strict clipping level. In the nromal clipping level, a detecting width is W1, and in the strict clipping level a detecting width is W2. W1 and W2 are sufficiently wide for correct detection.

On the contrary, in case of the deteriorated sector, width W3 at the strict clipping level is very narrow as shown in FIG. 5(b). This is because that the sector is deteriorated. Therefore, the enlargement of the burst error caused by a defect in the medium can be also detected by shifting the clipping level.

Next, the marking operation for the deteriorated sector is described. If a sector is determined to be the deteriorated sector, the CPU 3 commands a marking operation to the controller 2. By receiving the marking command, the controller 2 commands the drive 1 to seek the target track. After completing the seek, the controller 2 sets the target track signal and sector address to the target sector circuit 23. When the target sector circuit 23 detects the target sector, it commands the line 113 to mark a trigger signal. By receiving the marking trigger signal, the marking signal generator/detector 22 generates the mark signal. The mark signal is inputted to the laser drive 6 through the OR gate 7. The head 5 records the marking signal to the target sectors being controlled by the laser drive 6.

Figure 6A:
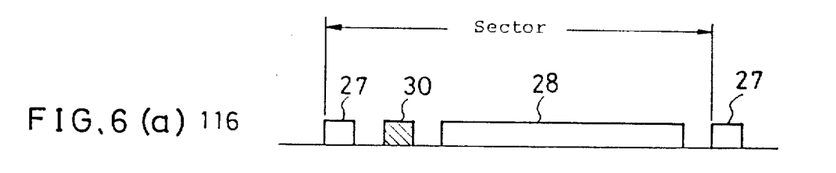
FIGS. 6(a) and 6(b), 6(c) and 6(d) are time charts for showing marking operation.

FIGS. 6(a) to 6(d) are time charts for showing the marking operation. FIGS. 6(a), (b) and (c) show the reproduced signal on the line 116 from recording medium at the part near the marked sector. Numeral 27 designates the sector identification part, numeral 28 designates the data field of recording information, and numerals 30 and 31 designate the marked part. The marked part 30 is marked by flags and is positioned prior to the data field 28.

Figure 6B:
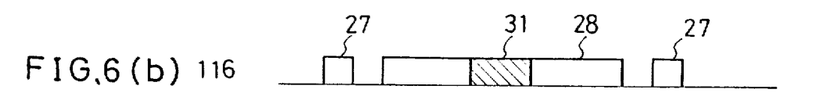
Figure 6C:
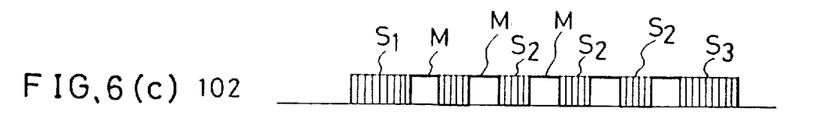

The marked part 31 is positioned in the data field 28. FIG. 6(c) shows the marking signal on the line 102. The marking signal has spacing parts S1, S2 and S3 and marking parts M. In the marking part, the recorded data signals are re-recorded to a dot that has a size larger than the interval of the data dot. In the spacing part S1, S2 or S3, a little part of the recorded data signals are re-recorded because the spacing parts has shorter dots than the interval of data dots. Therefore, the spacing part can be easily distinguished from the marking part.

Figure 6D:
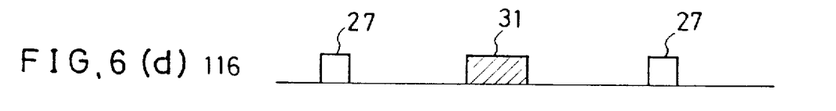

In the other embodiments, the marking signal 31 may be recorded after erasing the data signals for easy detecting as shown in FIG. 6(d).

The marking parts 30, 31 are detected in the searching operation for target sector. In other words, on the read operation, the recorded marking signals are inputted to the generator/detector 22 for marking signal, and are detected. Therefore, the throughput of the system does not decrease.

Figure 7:
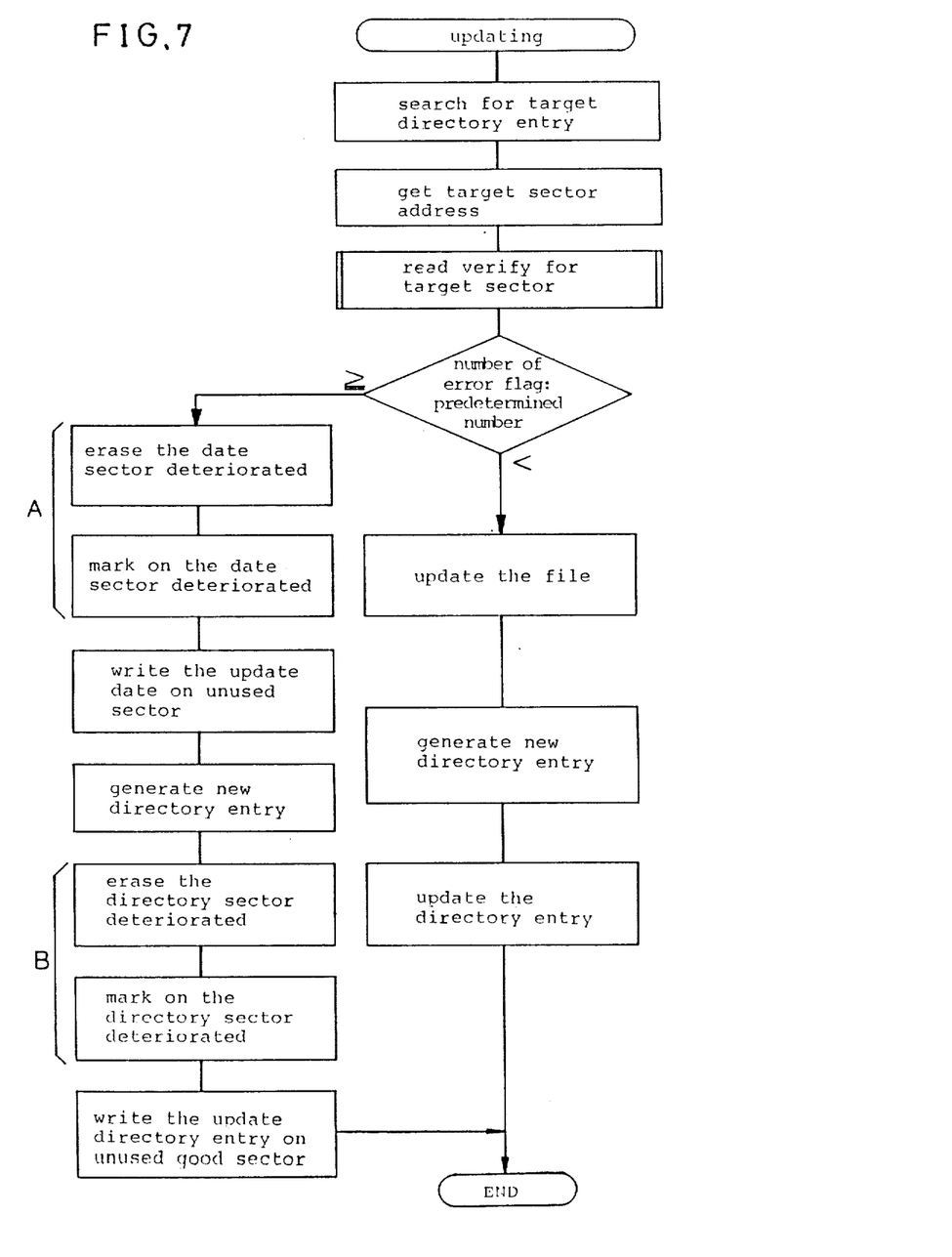
FIG. 7 is a flow chart of an update operation.

FIG. 7 is a flow chart for showing the update operation when using the marking signal shown in FIG. 6(d). In this embodiment, the basic steps are the same as those of the aforementioned embodiment shown in FIG. 3. The differences are that the deteriorated sectors are erased before the marking. In this embodiment, the marking signal can be easily detected.

As has been described in detail for various embodiments, the information recording and reproducing apparatus in accordance with the present invention can prevent a reproducing error caused by deterioration of recording medium, as a result of introducing the detecting means and the update control means. In the present invention, the recording medium can be used repeatedly to limit the effect of deterioration without error.

What we claimed is

1. An information recording and reproducing apparatus using a reversible optical disk having a recording area with sectors and a directory sector which indicates an area in said recording area, comprising:
    recording means for recording information including an error correction code;
    error detecting means, receiving a reading signal indicative of recorded information on sectors of said optical disk for generating an error number signal indicative of a number of errors detected by verifying said error correction code in said reading signal said error detector means comprising:
    (a) means for producing a strict clipping level, which is a level stricter than a usual level which is recognized as a particular signal level;
    (b) comparator means for comparing said reading signal with said strict clipping level and producing an error signal based on said comparison; and
    (c) means for counting said error signals;
    checking means responsive to said error number signal from said error detecting means for checking a sector to determine if it is a bad sector, when said error number signal indicates a number of errors over a predetermined number;
    second recording means, connected to said checking means, for recording a mark signal on any bad sector detected by said checking means; and
    processing means for;
    (a) read-verifying a target sector using said clipping level producing means and said comparator means of said error detecting means before updating data;
    (b) receiving a result of said error detecting means from said checking means; and
    (c) recording said mark signal using said second recording means on any sector determined to be a bad sector.

2. An information recording and reproducing apparatus in accordance with claim 1, wherein said processing means is also for:
    (d) carrying out a read verifying operation for said directory sector before renewing information on said directory sector and recording renewed directory information to the directory sector when said error number signal indicates a number which is smaller than said predetermined number.

3. An information recording and reproducing apparatus in accordance with claim 1, wherein said second recording means includes means for recording mark signals on bad sectors after erasing data on said bad sectors.

4. An information recording an reproducing apparatus in accordance with claim 1, wherein
    said second recording means includes means for recording said mark signals on bad directory sectors and for recording new directory information on other directory sectors.

5. A method for recording and reproducing information on a reversible optical disk having a recording area formed with sectors and a directory sector which indicates an area in said recording area, comprising the steps of:
    recording information including an error correction code;
    receiving a signal indicative of said recorded information;
    producing a strict clipping level which is a level stricter than a usual level that is recognized as a particular signal level;
    comparing said signal indicative of said recorded information with said strict clipping level and producing an error signal based on said comparison;
    counting a number of said error signals, and producing an error number signal indicative thereof;
    checking a sector to determine if it is a bad sector when said error number signal indicates a number of errors over a predetermined number;
    recording a mark signal on any bad sector;
    verifying a target sector, before updating data, by comparing a signal indicative of recorded information with said strict clipping level; and
    recording on only ones of said target sectors which are not detected to be bad.

6. A method as in claim 5 comprising the further step of verifying said directory sector before renewing information thereon.

7. Apparatus as in claim 5 comprising the further step of recording mark signals on bad sectors after erasing data on said bad sectors.

8. A method as in claim 5 comprising the further step of recording said mark signals on bad directory sectors and recording new directory information on other directory sectors.

* * * * *